United States Patent [19]

Takanashi et al.

[11] 4,215,364
[45] Jul. 29, 1980

[54] COLOR TELEVISION SIGNAL GENERATING APPARATUS

[75] Inventors: Itsuo Takanashi; Shintaro Nakagaki; Tadayoshi Miyoshi, all of Yokohama; Koichiro Motoyama, Ninomiya; Kenichi Miyazaki, Sagamihara; Sumio Yokokawa, Yokohama, all of Japan

[73] Assignee: Victor Company of Japan, Ltd., Yokohama, Japan

[21] Appl. No.: 16,092

[22] Filed: Feb. 28, 1979

[30] Foreign Application Priority Data

Mar. 3, 1978 [JP] Japan ................................ 53-23590

[51] Int. Cl.² ............................................. H04N 9/07

[52] U.S. Cl. ..................................................... 358/47
[58] Field of Search ..................................... 358/43–47

[56] References Cited

U.S. PATENT DOCUMENTS

| 3,846,579 | 11/1974 | Takanashi et al. | 358/47 |
| 4,041,528 | 8/1977 | Miyoshi et al. | 358/47 |

Primary Examiner—John C. Martin

[57] ABSTRACT

A color television camera has red filter stripes overlying wider blue filter stripes which in turn overlie a green filter layer. Frequency selective decoding circuitry is provided for separating the red, blue and green representative components of the camera signal.

10 Claims, 22 Drawing Figures

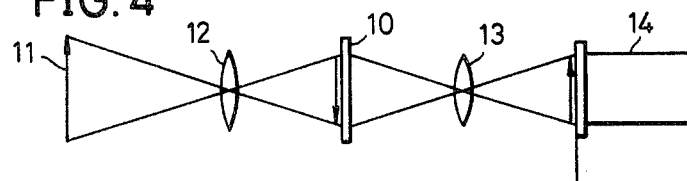
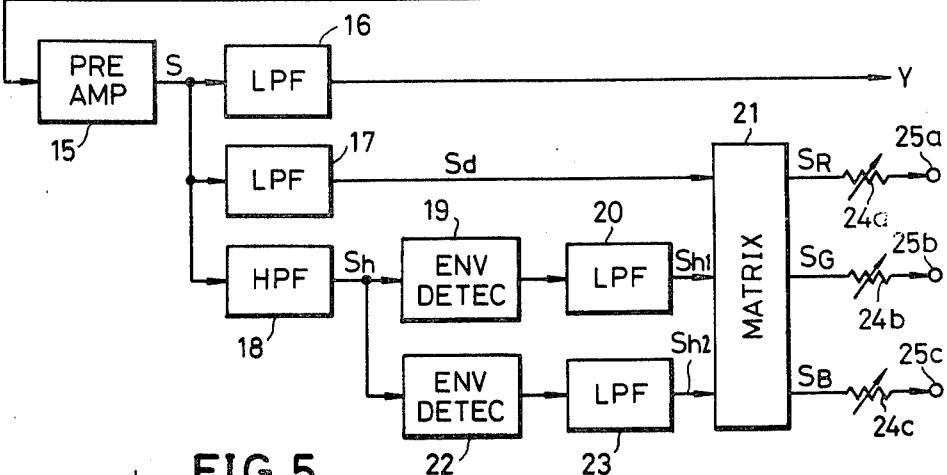
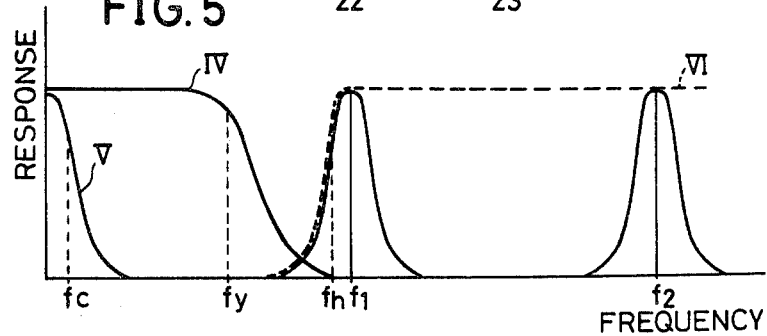
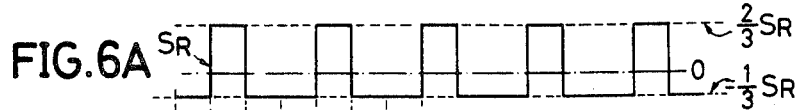
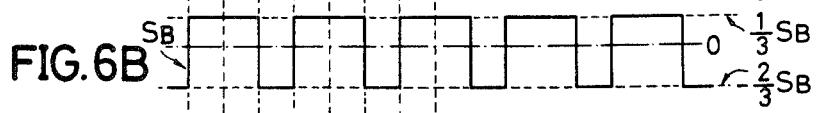
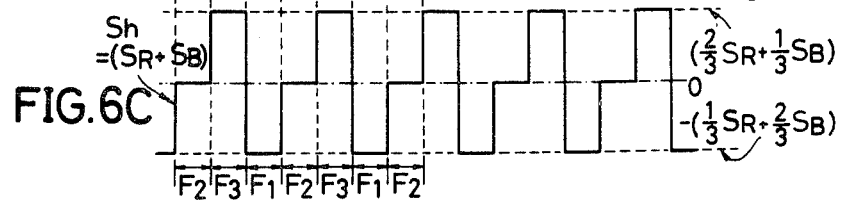

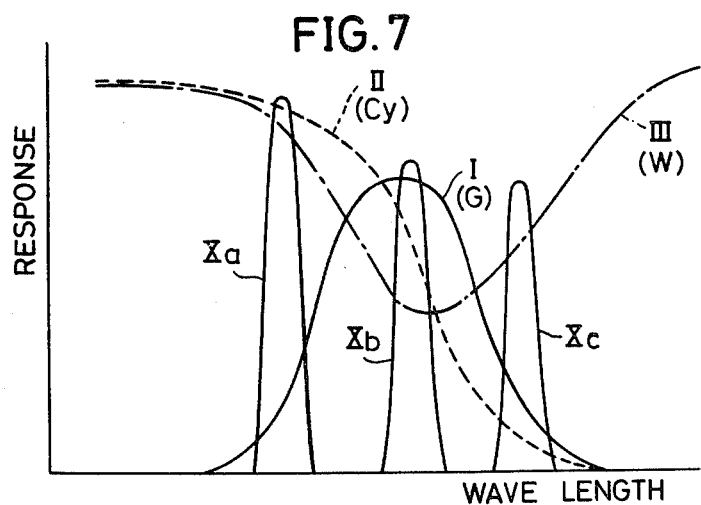
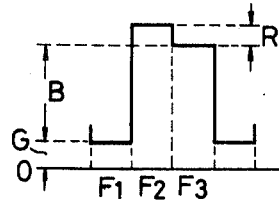
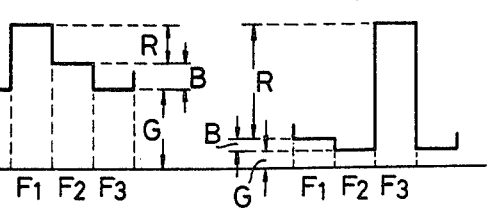
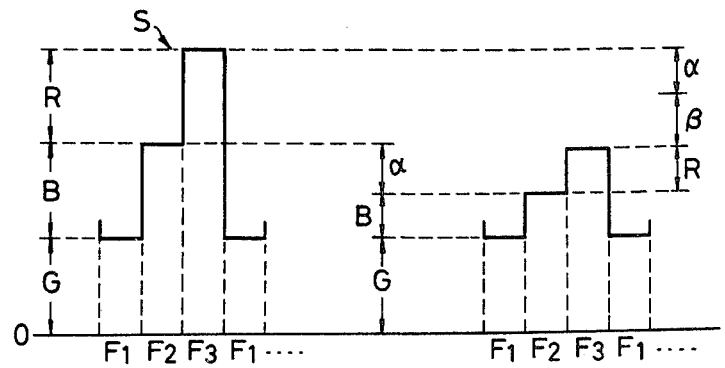

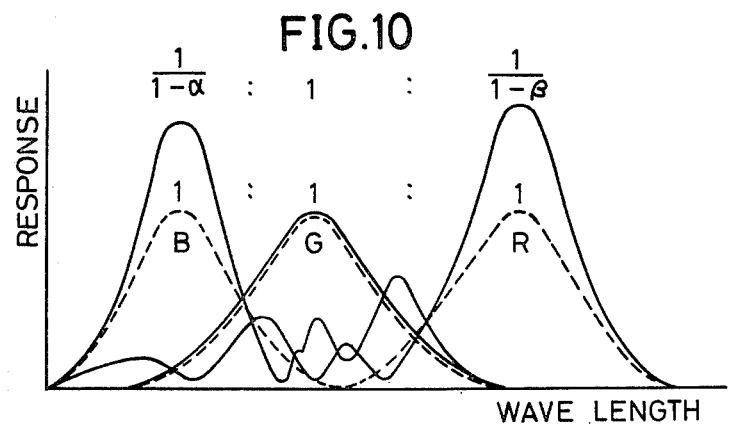
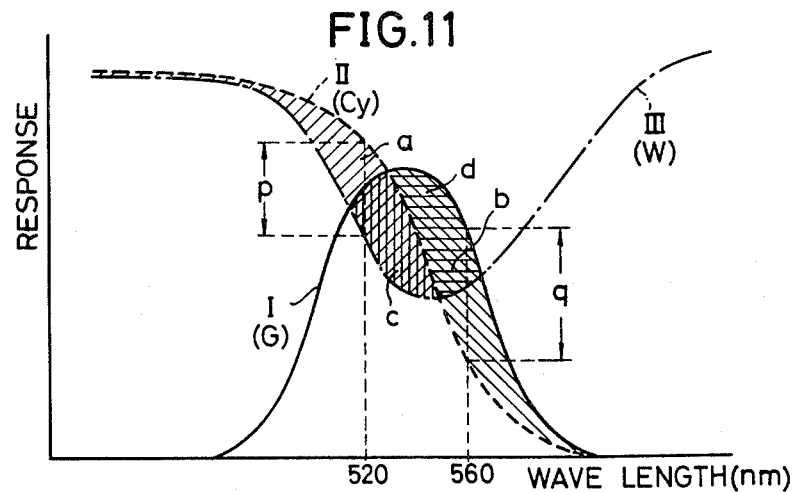
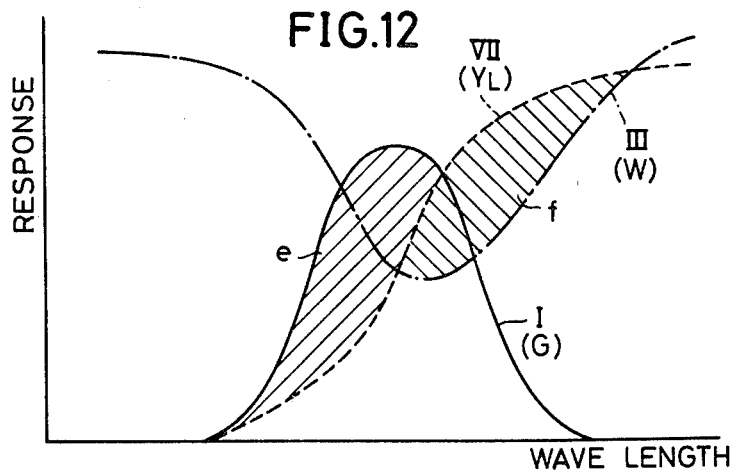

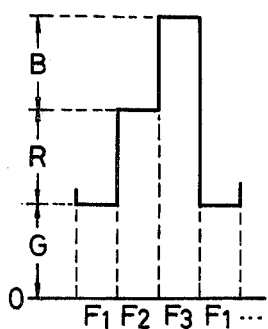
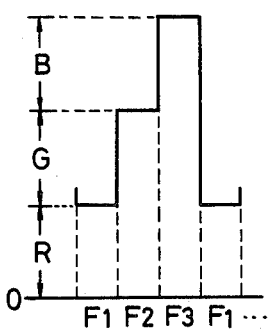
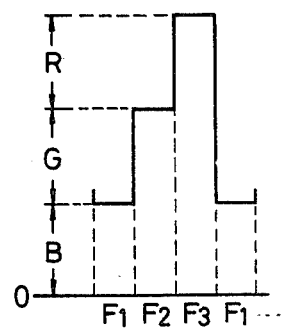
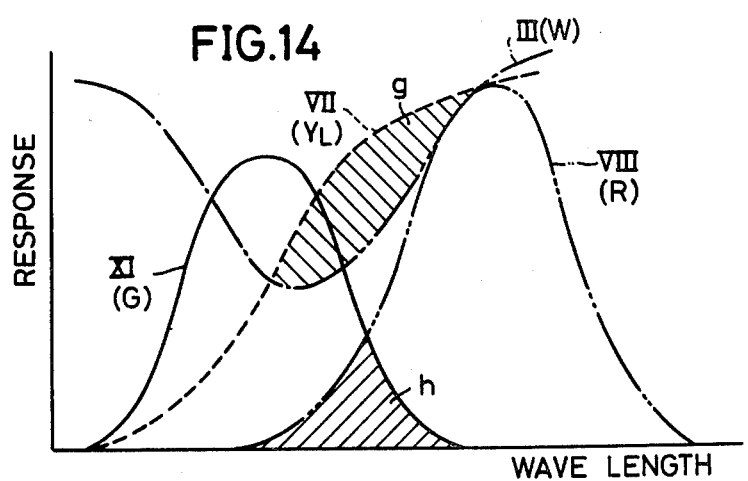
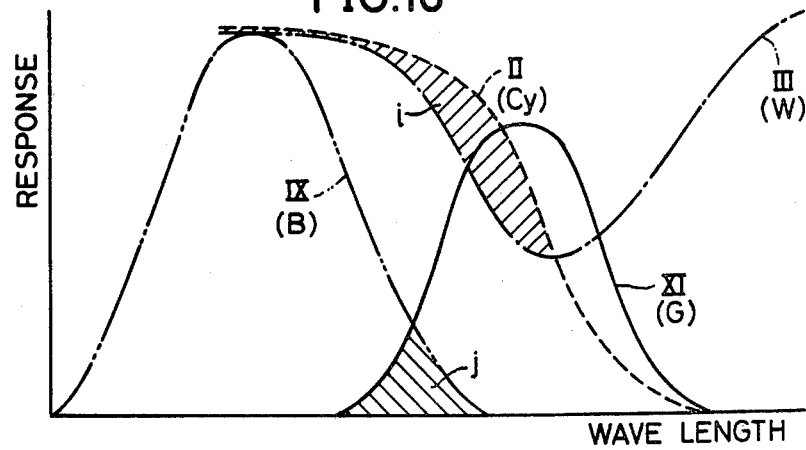

COLOR TELEVISION SIGNAL GENERATING APPARATUS

BACKGROUND OF THE INVENTION

The present invention relates generally to color television signal generating apparatuses and more particularly to a color television signal generating apparatus comprising a camera tube, a color-resolving striped filter provided on the camera tube, and a circuit for processing a signal obtained from the camera tube.

Among the simple types of known color television cameras, there is a so-called single-tube type in which a single pickup or camera tube, having a color-resolving striped filter in its optical system, is used to generate luminance signals and color signals. Also, a color television camera has two tubes in one pickup or camera tube. One tube is used for generating luminance signals, and the other tube has a color-resolving striped filter within its optical system to generate color signals.

In either of the above mentioned color television camera types, the color-resolving striped filters are of the phase-separation or the frequency-separation system.

In a color-resolving striped filter of the phase-separation type, however, there has been the disadvantageous requirement that the color-resolving striped filter have a complicated organization, including index stripes. Another disadvantageous requirement is that a complicated has been required for generating sampling pulses on the basis of information obtained from these index stripes. A further problem is that noise results in the conversion of color information signals by a "sampling hold" of a dot-sequential system. In this system, a signal is obtained by sampling and inadvertently introducing noise of high frequency into simultaneous color information signals included in the dot-sequential. The color information signals become stretched along the time axis and are converted into noise of conspicuously low frequency, whereby the signal-to-noise ratio becomes low.

A color-resolving striped filter of the frequency-separation system does not encounter the above described difficulties accompanying a known color-resolving striped filter of the phase-separation system. However, there are interference fringes (moire), due to various causes, since two sheets of striped filters of different space frequency values are fabricated in combination. In addition, the frequency fluctuation of a carrier wave generated in the output signal, as a result of non-linearity of the deflection system of the camera tube, is a large problem. Often, there are further difficulties, such as shading due to a difference in degrees of modulation, at the peripheral region and the central region in the target surface of the camera tube.

The present applicant has previously proposed a novel "Color television signal generating apparatus" which overcomes the above described disadvantages by U.S. Pat. No. 4,041,528. This previously proposed color television signal generating apparatus comprises a color-resolving striped filter, in a camera tube, for separating the output signal of the camera tube into required signals. Detecting means detects the envelopes of specific positive wave and negative wave signals thus separated. The output of the camera tube is a superimposed signal of a direct wave signal containing signals of three primary colors, of additional mixed colors, and a high-band component signal comprising a group of modulated color signals. This camera output signal results from the amplitude modulation of a carrier wave responsive to filter stripes in the color-resolving striped filter. The carrier wave components have a high harmonic relation relative to two primary color signals. The separating means comprises first separating means for separating the direct signal from the above mentioned superimposed signal and second separating means for separating the high-band component signal. The envelope detecting means comprises a first detector for producing a demodulated output signal in accordance with an envelope resulting from a successive connection of peak values of the positive wave of the thus separated high-band component signal. A second envelope detection means produces a demodulated output signal in accordance with an envelope resulting from a successive connection of peak values of the negative wave of the thus separated high-band component signal.

However, the transmission characteristics (spectral characteristics) of the filter stripes of the color-resolving striped filter, in general, must be such that the wavelength versus response characteristic curves thereof do not mutually intersect. For this reason, it has been very difficult to mass produce color-resolving striped filters while controlling the characteristics so that the filter stripes will strictly have the desired transmission characteristics in this manner, and this difficulty has been the reason for the impossibility of producing these filters to sell at low price.

SUMMARY OF THE INVENTION

Accordingly, in accordance with the present invention, this problem is solved by positively setting the transmission characteristic curves of the filter stripes so that they will mutually intersect, and as a result, moreover, the chroma quantity can be increased, whereby an excellent picture quality is obtained, and a characteristic such that the S/N ratio becomes large is produced.

That is, it is a general object of the present invention to provide a novel and useful color television signal generating apparatus in which the above described problems have been solved.

Another and specific object of the invention is to provide a color television signal generating apparatus in which a color-resolving striped filter whose filter stripes have transmission characteristics such that the characteristic curves mutually intersect is provided on the front surface of camera tube. Since the transmission characteristics are so set that they positively intersect in accordance with the invention, the control of the characteristics in the production processes of the color separation stripe filter is facilitated, and the filter can be produced to sell at low price. Furthermore, since the chroma quantity at the time of image pickup is large, the picture quality is improved, and the S/N ratio is large, whereby an excellent camera pickup signal is obtained.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 4 is a combined optical and block diagram illustrating a first embodiment of a color television signal generating apparatus, according to the present invention;

FIG. 5 is a graphical representation indicating the frequency responses of the output signal of a camera tube and the filtering characteristic of a filter in the apparatus shown in FIG. 4;

FIGS. 6A, 6B, and 6C are diagrams respectively indicating waveforms of high-frequency band components produced as output signals of a high-pass filter when the incident light on the color television image-pickup apparatus is red, blue, and white, respectively;

FIG. 7 is a graph indicating the transmission characteristics of the filter stripes of the color-resolving striped filter of the apparatus of the invention and the wavelength regions of a chromatic color object;

FIGS. 8A, 8B, and 8C are waveform charts respectively of camera tube output signals at the time of pickup of the image objects of the colors of the wavelength regions indicated in FIG. 7;

FIGS. 9A and 9B are waveform charts respectively of camera tube output signals produced when white light is picked up through the use of the color-resolving striped filter of a previously proposed apparatus and the color-resolving striped filter of the apparatus of the present invention;

FIG. 10 is a graph indicating the output signal levels of the apparatus illustrated in FIG. 4;

FIG. 11 is a graph indicating transmission characteristics for a description of a method of setting the transmission characteristics of the filter stripes of the color-resolving striped filter of the apparatus of the invention so as to prevent the occurrence of hue error;

FIGS. 12 and 13 are respectively a characteristic graph of a second embodiment of the invention of the transmission characteristics of the filter stripes of the color-resolving striped filter of the apparatus of the invention and a waveform chart of the output signal of a camera tube on which the filter is attached;

FIGS. 14 and 15 are respectively a characteristic graph of a third embodiment of the invention of the transmission characteristics of the filter stripes of the color-resolving striped filter of the apparatus of the invention and a waveform chart of the output signal of a camera tube on which the filter is attached; and FIGS. 16 and 17 are respectively a characteristic graph of a fourth embodiment of the invention of the transmission characteristics of the filter stripes of the color-resolving striped filter of the apparatus of the invention and a waveform chart of the output signal of a camera tube on which the filter is attached.

DETAILED DESCRIPTION

Figure 1:
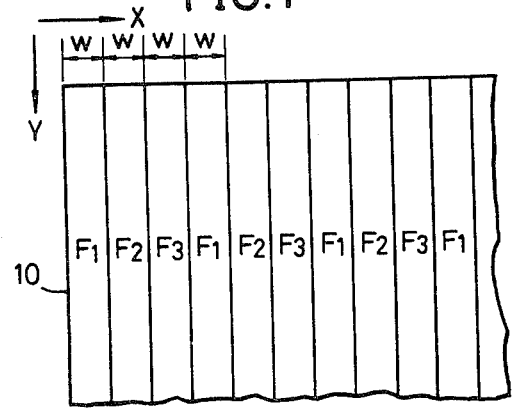
FIG. 1 is an enlarged, fragmentary frontal view of a color-resolving striped filter for use in the color television signal generating apparatus of the present invention.

One embodiment of a color-resolving striped filter for use in the apparatus of the present invention is illustrated in FIG. 1. The color-resolving striped filter 10 is made up of first, second, and third filter stripes F1, F2, and F3 of equal widths w. Each stripe has an oblong, narrow shape in the vertical direction. The stripes are laid consecutively and contiguously in the order named above, stripes F1, F2, and F3 constituting one group. A plurality of such groups are laid consecutively and contiguously side-by-side in a single place. The widths of these filter stripes may be selected at will. These filter stripes F1, F2 and F3, of all groups, extend in the direction (direction Y in FIG. 1) which is perpendicular to the horizontal scanning direction (direction X in FIG. 1). The stripes are arrayed in an orderly manner in the above mentioned sequence, and all filter stripes have the same spatial frequency.

The light transmitting characteristics respectively of these filter stripes F1, F2 and F3 are as follows. The first filter stripe F1 is adapted to transmit light of one primary color from among the three primary colors (red, green, and blue) of addition mixed colors. The second filter stripe F2 is adapted to transmit light of mixed colors of the primary color transmitted through the first filter stripe and one of the two remaining primary colors (i.e. not the primary color transmitted through the first filter stripe). The third filter stripe F3 is adapted to transmit the light of all colors (e.g. white light).

More specifically, the second filter stripe F2 is capable of transmitting light of colors respectively having the following relationships, depending on whether the primary color transmitted through the first filter stripe F1 is red, green or blue.

| Primary color light transmitted through first filter stripe F1 | Color of light transmitted through second filter stripe F2 |
|---|---|
| red light | magenta (red blue) or yellow (red green) |
| green light | yellow (red green) or cyan (blue green) |
| blue light | magenta (red blue) or cyan (blue green) |

Figure 2:
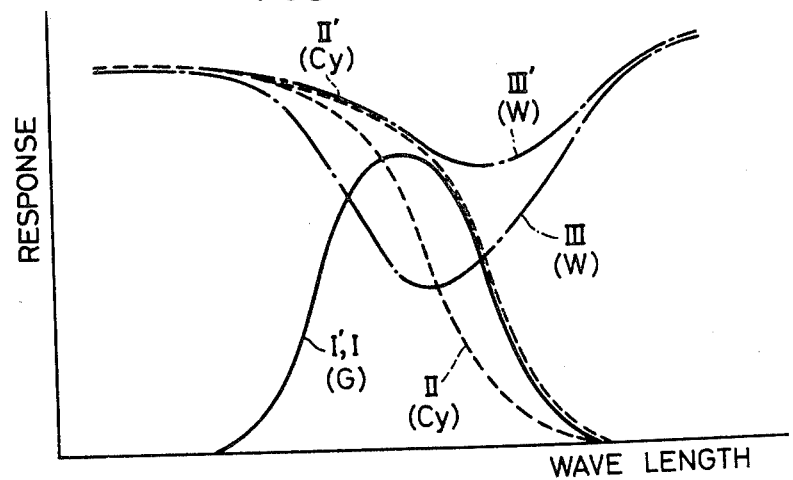
FIG. 2 is a graphical representation indicating the transmission characteristics of respective filter stripes of the color-resolving striped filter constituting an essential part of the apparatus of the present invention, together with the transmission characteristics of a general color-resolving striped filter.

A first embodiment of the transmission characteristics of the filter stripes of the color-resolving striped filter of the above described organization is shown in FIG. 2. The first filter stripe F1 has a transmission characteristic I passing green light (G). This transmission characteristic I is the same as the general green light transmission characteristic I. The second filter stripe F2 has a transmission characteristic II passing light of a mixed color of blue light (B) and green light (G) (that is, cyan (Cy)). This transmission characteristic II has a falling slope part which is further to the short wavelength side than the general cyan light transmission characteristic II' and intersects the characteristic I at its rising part slightly to the short wavelength side of its peak part. The third filter stripe F3 has a transmission characteristic III passing the light of all colors, that is white light (W), that is, a mixed color light of red light (R), green light (G), and blue light (B). This transmission characteristic III has a lower response at its valley part than the general white light transmission characteristic III' and has a falling characteristic part which intersects the above described characteristic I at its rising characteristic part and a rising characteristic part which intersects the characteristic I' at its falling characteristic part. That is, in a certain wavelength region of the response of the characteristic I, the responses of the characteristics II and III are lower than those of the characteristics II' and III'.

Figure 3:
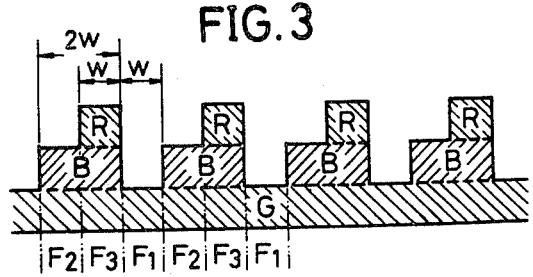
FIG. 3 is a diagram indicating the energy distribution of transmitted light when white light is projected onto the general color-resolving striped filter shown in FIG. 1.

If these filter stripes F1, F2, and F3 have the general light transmitting characteristics I', II', III', the energy state of the light transmitted when a white light (W) is projected onto the color-resolving striped filter 10 is as illustrated by one example in FIG. 3, in which the horizontal direction (X-axis direction) represents energy distribution. That is, green light (G) is continuously distributed since it is transmitted through all filter stripes F1, F2 and F3. Blue light (B) is distributed over a width 2w separated by space intervals w, since it only passes through the filter stripes F2 and F3. Red light (R) is distributed over a width w separated by space intervals of 2w since it is only transmitted through the filter stripe F3.

The color television signal generating apparatus, according to the present invention, in which the above described color-resolving striped filter 10 is used will now be described with respect to one embodiment thereof and with reference to FIG. 4.

In the apparatus diagrammatically represented in FIG. 4, the image light from an object 11 to be televised passes through the camera lens 12 of a single tube type color television camera and forms an image on the color-resolving striped filter 10. The optical image thus formed on this filter 10 is transmitted by way of a relay lens 13 and forms an image on the photoconductive surface (or photoelectric surface) of a camera tube 14.

When a white light image is introduced as incident light passing through the camera lens 12, the resulting output signal S obtained from the camera tube 14. This light can be represented as a periodic function having a fundamental repetitive period described by the pitch of the respective stripes of the color-resolving striped filter. This signal is represented by the following Fourier series:

$$S = SG + \tfrac{2}{3} SB + \tfrac{1}{3} SR - \frac{3}{2\pi} (SB + SR) \sin \omega t \qquad (1)$$

$$- \frac{\sqrt{3}}{2\pi} (SB - SR) \cos \omega t - \frac{3}{4\pi} (SB + SR) \sin 2\omega t$$

$$- \frac{\sqrt{3}}{4\pi} (SR - SB) \cos 2\omega t +$$

The output signal S represented by the above equation (1) is also represented as $$S = Sd + Sh \ldots \qquad (2)$$

where the signal Sd is a direct wave (DC component) signal comprising a mixture of a luminance signal Y, a green light signal SG, a blue light signal SB, and a red light signal SR. The resulting signal can be represented by $$Sd = SG + \tfrac{2}{3} SB + \tfrac{1}{3} SR \ldots \qquad (3)$$

The signal Sh is a high-band component (AC component) signal comprising a group of modulated color signals having forms resulting from amplitude modulation of specific carrier wave and other carrier waves with a mixture signal. The specific carrier wave has a frequency which is the same as the space frequency determined by the number of groups of filter stripes F1, F2 and F3 of the color-resolving striped filter 10. The other carrier waves have frequencies which are the same as higher harmonics of the specific carrier wave. The mixture signal is made up of two primary colors other than the primary (which is green color light in the instant example) passing through the first filter stripe F1.

The above mentioned output signal S of the camera tube 14 is amplified by a preamplifier 15. Then, it is supplied to low-pass filters 16 and 17 and a high-pass filter 18. The low-pass filter 16 has a filtering characteristic shown by curve IV (FIG. 5), which is an upper-limit cut-off frequency fy of approximately 2.5 MHz. A luminance signal Y is derived from the output signal of filter 16 (curve IV). The low-pass filter 17 has a filtering characteristic shown by curve V, with an upper-limit cut-off frequency fc of approximately 0.5 MHz, from which the above mentioned direct signal SD is derived. The high-pass filter 18 has a filtering characteristic shown by curve VI with a low-limit cut-off frequency fh. The above mentioned high-band component signal Sh is derived from the signal of curve VI.

In FIG. 5, frequency f1 indicates a carrier wave of a frequency which is determined by the number and space frequency of filter stripe groups of the color-resolving striped filter 10, this frequency being approximately 3.25 MHz, for example, when there are 170 groups of the filter stripes. The frequency f2 indicates the second harmonics (of approximately 6.5 MHz) of the carrier wave of the above mentioned frequency f1.

If a color-resolving striped filter having the characteristic indicated in FIG. 3 is used, only a modulated color signal having a component of the signal SB due to blue light B and a modulated color signal having a component of the signal SR due to red light R exist in the signal Sh. A signal component due to green light G is not contained therein. The angular frequencies $\omega$ and $2\omega$ and the above mentioned frequencies f1 and f2 have the relationships $\omega = 2\pi f1$ and $2\omega = 2\pi f2$.

When only red light reaches the camera lens 12, the high-band component signal Sh is only the red signal SR indicated in FIG. 6A. When only a blue light is imparted, the high-band component signal Sh becomes only the blue signal SB indicated in FIG. 6B. Furthermore, when a white light is imparted to the camera, the high-band component signal Sh becomes a signal of a waveform as indicated in FIG. 6C.

Here, the interval on the time axis within which the red signal SR and the blue signal SB can be generated is determined by the positions of the filter strips F1, F2, and F3. For this reason, there is a constant phase relationship between the blue signal SB and the red signal SR when these two signals are simultaneously present, at any point on the time axis.

Accordingly, if the red signal SR of the waveform indicated in FIG. 6A and the blue signal SB of the waveform indicated in FIG. 6B are mixed, the resulting signal is a high-band component signal Sh of the waveform indicated in FIG. 6C. In FIGS. 6A, 6B, and 6C, the lines O—O represent the average zero level (alternating current axis) of the respective signals. The peak value of the positive wave of the red signal SR (FIG. 6A) is $\tfrac{2}{3}$SR. The peak value of the negative wave thereof is $-\tfrac{1}{3}$SR. The peak value of the positive wave of the blue light SB (FIG. 6B) is $\tfrac{1}{3}$SB, while the peak value of the negative wave thereof is $-\tfrac{2}{3}$SB. Furthermore, the peak value of the positive wave of the high-band component signal Sh (FIG. 6C) is ($\tfrac{2}{3}$SR+$\tfrac{1}{3}$SB), while the peak value of the negative wave thereof is $-(\tfrac{1}{3}$SR+$\tfrac{2}{3}$SB).

The high-band component signal Sh is indicated in FIG. 6C which has been derived from the high-pass filter 18. Single Sh is supplied respectively to envelope detector circuits 19 and 22, where the positive wave and negative wave, respectively, are envelope detected.

The output demodulated signals of the envelope detector circuits 19 and 22 are supplied to a matrix circuit 21 by way of low-pass filters 20 and 23, as signals Sh1 and Sh2. The low-pass filters 20 and 23 may be provided if necessary, and their pass-band width may be the same as that of the above mentioned low-pass filter 17.

The signals Sh1 and Sh2 thus supplied from the envelope detector circuits 19 and 22 to the matrix circuit 21 correspond respectively to the envelopes of the positive and negative waves of the high-band component signal Sh. For this reason, these signals can be expressed by the following equations:

$$Sh1 = (\tfrac{2}{3}SR + \tfrac{1}{3}SB) \ldots \quad (4)$$

$$Sh2 = -(\tfrac{1}{3}SR + \tfrac{2}{3}SB) \ldots \quad (5)$$

The matrix circuit 21 receives these signals Sh1 and Sh2 together with the direct-wave signal Sd, which is represented by Eq.(3), from the low-pass filter 17. As a result, the matrix circuit 21 produces three primary color output signals SG, SR, and SB for green red, and blue.

$$SG = Sd + Sh2 \ldots \quad (6)$$

$$SR = (Sh1 \times 2) + Sh2 \ldots \quad (7)$$

$$SB = -\{(Sh2 \times 2) + Sh1\} \ldots \quad (8)$$

The above described apparatus has the following advantageous features.

1. Since a filter comprising filter stripes F1, F2, and F3 of respectively equal space frequency are used for the color-resolving striped filter, moire does not occur.

2. Since the system is not a phase separation system, stripes are not necessary for generating index pulses in the color-resolving striped filter, the camera tube, and other parts. Therefore, the color-resolving striped filter and the camera tube become simple and can be readily fabricated. Furthermore, since the rate of utilization of the incident light is improved, a bias light is unnecessary.

3. The positive and the negative waves of the high-band component signal are, respectively, envelope detected to obtain two 2-color mixture signals. Thus, it is possible to provide a color television signal generating apparatus with an excellent performance, which is simple and can be produced at low cost.

In the case where, as shown in FIG. 7, light rays of wave length regions Xa, Xb, and Xc are respectively introduced as incident light with respect to a color-resolving striped filter comprising filter strips having transmission characteristics I, II, and III which are the same as those indicated in FIG. 2, the waveforms of the output signals of the camera tube become as indicated in FIGS. 8A, 8B, and 8C. The output signals are supplied to a circuit as shown in FIG. 4 and subjected to an operation as described above by the matrix circuit 21. For this reason, no matter which of the waveforms indicated in FIGS. 8A, 8B, and 8C is assumed by the output signals, of the output signals corresponding to the filter stripes F1, F2, and F3, a signal corresponding to a level from zero level to that of lowest peak value of the signal value is obtained as a green (G) signal; a signal corresponding to the difference in levels of the lowest signal level peak value and that of the second highest peak value is obtained as a blue (B) signal; and a signal corresponding to the difference in levels of the second peak value of the signal level and the highest peak is obtained as a red (R) signal.

Then, in the case where the filter stripes of the color-resolving striped filter have the general transmission characteristics I', II', and III', when a white light enters as incident light, the output signals of the camera tube have waveforms as indicated in FIG. 9A as described hereinabove in conjunction with FIG. 3. However, the filter stripes of the color-resolving striped filter 10 in the apparatus of the present invention have the characteristics I, II, and III as described above, of which the characteristics II and III, particularly, have lower response than the general characteristics II' and III' in the vicinity of the region of the green wavelength.

For this reason, when a white light is introduced as incident light into the color-resolving striped filter of the apparatus of the invention, the levels of the signal parts corresponding to the filter stripes F2 and F3 of the output signals of the camera tube are lower than those in the case indicated in FIG. 9A, and the waveforms of the output signals of the camera tube become as indicated in FIG. 9B. These signals pass through the circuit system shown in FIG. 4 and are subjected to an operation by the matrix circuit 21. As a result, a green signal SG according to the peak value of the output signal corresponding to the filter stripe F1, a blue signal SB in accordance with the level difference between the peak values of the output signals corresponding to the filter stripes F1 and F2, and a red signal SR in accordance with the level difference between the peak values of the output signals corresponding to the filter stripes F2 and F3 are respectively obtained. Then, since the levels of the output signals corresponding respectively to the filter stripes F2 and F3 are lowered as mentioned above, the blue signal SB and the red signal SR are respectively smaller by α and β than those in the case where a color-resolving striped filter having the general transmission characteristics is used, as will be apparent from a comparison of FIGS. 9A and 9B.

Then, when a color-resolving striped filter comprising filter stripes having the general transmission characteristics I', II', and III' is used, and the gains of gain adjusters 24a, 24b, and 24c in the circuit system shown in FIG. 4 are adjusted thereby to attain white balance, red, green, and blue signals of a composition ratio respectively of 1:1:1 are obtained through output terminals 25a, 25b, and 25c. Accordingly, the ratio of the spectral characteristics of the output signal composition in the case where red, green, and blue are respectively picked up by the camera becomes 1:1:1 as indicated by intermittent line in FIG. 10.

Then, when the camera tube output signals obtained through the use of the color-resolving striped filter in the present invention are passed through the circuit system shown in FIG. 4 in which white balance has been attained as mentioned above, a red signal SR and a blue signal SB are led out in their respectively low-level states through the terminals 25a and 25c. For example, the level ratio of the green signal SG, blue signal SB, and red signal SR led out through the terminals 25b, 25c, and 25a becomes 1:0.5:0.4.

When the color-resolving striped filter in the invention is used, in order to attain a white balance so that the level ratio of the signals obtained through the terminals 25a, 25b, and 25c will be 1:1:1, the gain adjusters 24a and 24c in the circuit system shown in FIG. 4 are adjusted to increase their gains.

The case wherein the color-resolving striped filter in the present invention is used in this manner with the circuit in the state of white balance, and blue light, green light, and red light are respectively picked up by the camera will be considered. In the color-resolving striped filter in the invention, the responses of the transmission characteristics respectively in the wavelength regions of the blue light and the red light are not lowered. Accordingly, the levels of the blue, green, and red signals SB, SG, and SR which have passed through the circuit system placed in a white balance state by increasing the gains of the gain adjusters 24a and 24c as described above and have been obtained through the terminals 25c, 25b, and 25a are as indicated by solid line in FIG. 10. The ratio of these levels becomes $1/(1-\alpha):1:1/(1-\beta)$.

Accordingly, by using a color-resolving striped filter in the invention and using a circuit system wherein white balance is attained, blue light and red light signals SB and SR are obtained with higher levels than those in the case where a color-resolving striped filter of the above mentioned general type is used. For this reason, the chroma quantity particularly in the case where an image object of a blue and red chromatic color is picked up by the camera is large. Therefore, signals of a picture quality which is higher than that in the case where a color-resolving striped filter of general transmission characteristics is used is obtained.

The chroma quantity with respect to green color is lower than that generally obtainable. However, when the luminance level is low, in general, the chroma level is sensed as being relatively high, and the picture quality, is also determined by appearance. For this reason, the effect of improvement of the picture quality due to the increase in the chroma quantity of the blue color and red color is greater than that of the lowering of the chroma quantity with respect to green color.

Next, the S/N ratio will be considered. In general, in order to obtain a large S/N ratio, measures such as increasing the intensity of the incident light and increasing the target voltage of the camera tube, such as a vidicon, thereby to increase the camera tube output would be easily considered. However, because of the restriction imposed by the limites of the dynamic range of a camera tube, such methods are not desirable for improving the S/N ratio. Accordingly, in the apparatus of the present invention, an iris provided at the position of the lens 12 (FIG. 4) is opened, and the quantity of incident light to the camera tube 14 is increased until the peak value of the output signal corresponding to the filter stripe F3 indicated in FIG. 9B becomes of an order equaling the peak value of the output signal corresponding to the filter stripe indicated in FIG. 9A. When the quantity of the incident light is increased in this manner, the conditions of use of the camera tube are the same as those in the general case and are not subject to the restriction of the dynamic range.

Accordingly, by passing the gain of all signals obtained through the output terminals 25a, 25b, and 25c, as a whole, through another gain adjuster (not shown), the level of the blue light signal SB or the red light signal SR is lowered so that it becomes of the same order as the level of a signal obtained in the case where a color-resolving striped filter of the above mentioned general type is used. As a result, the gain of the circuit system is lowered by an amount corresponding to the above mentioned increase in the chroma quantity, whereby the S/N ratio is greatly improved. By this measure, noise is reduced, and, moreover, color shading at the time of white image pickup is reduced.

In the circuit arrangement described above, the gains of the gain adjusters 24a and 24c are adjusted to large values, and the output signals of the terminals 25a, 25b, and 25c are passed through other gain adjusters for further lowering of gain. Instead, the gain of the gain adjuster 24b may be made relatively small in comparison with the gains of the gain adjusters 24a and 24c. In this case, the above mentioned other gain adjuster to which the signals of the output terminals 25a, 25b, and 25c are supplied become unnecessary. In this case, also, the opening of the iris to the above described degree is similarly carried out.

Next, hue error between the color output signals will be considered. In the case where the color-resolving striped filter having the above described transmission characteristics according to the present invention is used, signal components which are unnecessary for the red and blue signals are produced in the green wavelength region as indicated in FIG. 10. These unnecessary signal components cause the occurrence of the hue error. However, if, in FIG. 10, the unnecessary signal component of the blue signal in the green signal band and the unnecessary signal component of the red signal in the green signal band are equal, a hue error will not be produced in the green signal, and only a luminance error will be produced. In general, however, as is known, the degree of permissiveness of the sense of vision with respect to luminance error is greater than that with respect to hue error. Therefore, if it is possible to eliminate hue error, the effect of the above mentioned unnecessary signal components will present no problem in actual practice.

A method of making the above mentioned unnecessary signal components of the blue and red signals equal will now be described with reference to FIG. 11. The area encompassed by the cyan light transmission characteristic II and the white light transmission characteristic III will be designated by reference character a. The area encompassed by the falling part of the transmission characteristics I of green light and the curve of the characteristic II will be designated by b. The area of the above defined area a encompassed by the characteristics I, II, and III will be designated by c. The area of the above mentioned area b encompassed by the characteristics I, II, and III will be designated by d. Then, the area (a−c) and the area d produce the red color unnecessary signal component, while the area c and the area (b−d) produce the blue color unnecessary signal component. Accordingly, the red color unnecessary signal component and the blue color unnecessary signal component in the wavelength band of the green light can be made equal by satisfying the following equation.

$$(a-c)+d=(b-d)+c \ldots \quad (9)$$

Eq.(9) will be satisfied if
c=d and a=b
when color reproducibility is considered, $c \geq d$ is actually desirable. For this reason, the value of a/b ($a \geq b$) is selected so as to satisfy Eq.(9) under this condition. The value of a/b is selected to be a value with the range of 1 to 2, as one example.

By controlling these regions encompassed by the various characteristic curves in this manner, a good color-resolving striped filter in which hue error is not produced can be readily produced.

Furthermore, the difference p between the characteristics II and III and the difference q between the characteristics I and II at wavelengths 520 nm and 560 nm as indicated in FIG. 11 may be controlled thereby to control the above defined areas a and b and the value of a/b. In this case, also, the differences p and q and the value of the ratio a/b are determined with consideration of the color reproducibility.

Other examples of the transmission characteristics of the filter stripes F1, F2, and F3 of the color-resolving striped filter will now be described. In a second embodiment of the invention as shown in FIG. 12, the green light (G) transmission characteristic I and the white light (W) transmission characteristic III of the filter stripes F1 and F2 are respectively the same as the characteristics I and III of the first embodiment of the invention shown in FIG. 2. The yellow light (YL) transmission characteristic VII of the filter stripe F3 is so set that its rising portion intersects the falling part of the characteristic I. The ratio of the area e bounded by the characteristics I and VII and the area f bounded by the characteristics III and VII is so determined that a phase error will not arise. The output signal waveforms of a camera tube provided with this filter are indicated in FIG. 13.

In a third embodiment of the invention as indicated in FIG. 14, the filter stripes F1, F2, and F3 respectively have a red light (R) transmission characteristic VIII, a yellow light transmission characteristic VII, and a white light transmission characteristic III. The characteristic VII is the same as the characteristic VII of the second embodiment of the invention shown in FIG. 12, and the characteristic III is the same as the characteristic III of the first embodiment of the invention illustrated in FIG. 2. The ratio of the area g encompassed by the characteristics III and VII and the area h encompassed by spectral characteristics XI and III of green color is so determined that phase error will not arise at the time when green light is picked up. The waveforms of the output signals of the camera tube are shown in FIG. 15.

In a fourth embodiment of the invention as indicated in FIG. 16, the filter stripes F1, F2, and F3 respectively have a blue light (B) transmission characteristic IX, a cyan light transmission characteristic II, and a white light transmission characteristic III. The characteristics II and III are the same as the characteristics II and III of the first embodiment of the invention illustrated in FIG. 2. The ratio of the area i encompassed by the characteristics II and III and the area j encompassed by spectral characteristics XI and IX of green color is so determined that phase error will not arise at the time when green light is picked up. The output waveform of the camera tube is indicated in FIG. 17.

In this connection, since the energy of a green signal as a visibility characteristic is high, the luminance characteristic of the output signal can be caused to approach the ideal luminance characteristic by preparing the filter stripe F1 so that it has a green light (G) transmission characteristic. For this reason, it is preferable to impart transmission characteristics to the filter stripes as in the first embodiment of the invention rather than as in the second, third, and fourth embodiments of the invention.

Further, this invention is not limited to these embodiments but various variations and modifications may be made without departing from the scope of the invention.

What is claimed is:

1. A color television signal generating apparatus comprising:

a color-resolving striped filter comprising a plurality of groups of filter stripes, said groups being disposed parallelly and consecutively in sequentially repeated arrangement, each of said groups comprising at least three filter stripes from among a first filter stripe having a light transmission characteristic such as to transmit the light of one of the three primary colors of an addition mixture color, a second filter stripe having a light transmission characteristic such as to transmit the light of a mixed color of the primary color transmitted through said first filter stripe and one of the other two primary colors, and a transparent third filter stripe transmitting white light, said at least three filter stripes being arranged parallelly and consecutively in a specific sequence;

a camera tube provided with said color-resolving striped filter disposed on the front surface thereof and operating to send out as an output signal a superimposed signal comprising, in superimposition, a direct wave signal containing signals of the three primary colors of said addition mixture color and a high-band component signal comprising a group of modulated color signals representable as signals resulting from the amplitude modulation respectively of a carrier wave of a frequency equal to a space frequency determined by the number of said groups of filter stripes and carrier wave components of frequencies having higher harmonic relationships to the frequency of said carrier wave by the signals of two primary colors other than the primary color of the light transmitted through said first filter stripe;

separation means for separating said direct wave signal from the output signal of said camera tube;

high-band component signal producing means for obtaining said high-band component signal or a signal equivalent thereto from the output signal of said camera tube;

first envelope detection means for producing as output a demodulated signal in accordance with an envelope resulting from a successive connection of peak values of the positive wave of the output signal of said high-band component signal producing means;

second envelope detection means for producing as output a demodulated signal in accordance with an envelope resulting from a successive connection of peak values of the negative wave of the output signal of said high-band component signal producing means; and operational means for obtaining three primary-color signals by operating the output signals of said separation means and first and second envelope detection means, at least two of the filter stripes of said first, second, and third filter stripes of said color-resolving striped filter having transmission characteristics which have been so selected that graphical curves indicating said transmission characteristics mutually intersect.

2. A color television signal generating apparatus as claimed in claim 1 in which said first filter stripe has a characteristic of transmitting green light, and said second and third filter stripes have respective transmission characteristics which have been so selected that graphical curves respectively indicating said transmission characteristics mutually intersect and, moreover, intersect a graphical curve indicating said characteristic of said first filter stripe.

3. A color television signal generating apparatus as claimed in claim 2 in which said second filter stripe has a cyan light transmission characteristic, and said third filter stripe has a white light transmission characteristic.

4. A color television signal generating apparatus as claimed in claim 2 in which the ratio of the area of that graphical region encompassed by graphical curves indicating the transmission characteristics of said second and third filter stripes and the area of that graphical region encompassed by graphical curves indicating the transmission characteristics of said first and second filter stripes is selected at a value such that hue error will not arise in the camera output signals.

5. A color television signal generating apparatus as claimed in claim 4 in which the value of said ratio of the areas is selected at a value within the range of 1 through 2.

6. A color television signal generating apparatus as claimed in claim 2 in which said second filter stripe has a yellow light transmission characteristic, said third filter stripe has a white light transmission characteristic, and the ratio of the area of that graphical region encompassed by graphical curves indicating the transmission characteristics of said first and second filter stripes and the area of that graphical region encompassed by graphical curves indicating the transmission characteristics of said second and third filter stripes is selected at a value such that hue error will not arise in the camera output signals.

7. A color television signal generating apparatus as claimed in claim 1 in which said second and third filter stripes have respective transmission characteristics whih have been so selected that graphical curves indicating said transmission characteristics mutually intersect, and the ratio of the area of that graphical region encompassed by the transmission characteristic curves of said second and third filter stripes and the area of that graphical region encompassed by a transmission characteristic curve of said first filter stripe and a curve indicating the spectral characteristic of green color is selected at a value such that hue error will not arise in the camera output signals.

8. A color television signal generating apparatus as claimed in claim 7 in which said first, second, and third filter stripes respectively have a red light transmission characteristic, a yellow light transmission characteristic, and a white light transmission characteristic.

9. A color television signal generating apparatus as claimed in claim 7 in which said first, second, and third filter stripes respectively have a blue light transmission characteristic, a cyan light transmission characteristic, and a white light transmission characteristic.

10. A color television signal generating apparatus as claimed in claim 1 which further comprises means for adjusting gains respectively with respect to the output signals of said operational means.

* * * * *